United States Patent
Yu

(10) Patent No.: US 9,497,310 B2
(45) Date of Patent: Nov. 15, 2016

(54) METHOD FOR CONTROLLING MOBILE PHONE TO BE MUTE THROUGH FLIP AND MOBILE PHONE

(71) Applicant: HUIZHOU TCL MOBILE COMMUNICATION CO., LTD., Huizhou (CN)

(72) Inventor: Bin Yu, Huizhou (CN)

(73) Assignee: HUIZHOU TCL MOBILE COMMUNICATION CO., LTD., Hui Zhou, Guangdong (CN)

( * ) Notice: Subject to any disclaimer, the term of this patent is extended or adjusted under 35 U.S.C. 154(b) by 173 days.

(21) Appl. No.: 14/398,363

(22) PCT Filed: Jun. 28, 2013

(86) PCT No.: PCT/CN2013/078466
§ 371 (c)(1),
(2) Date: Oct. 31, 2014

(87) PCT Pub. No.: WO2014/032472
PCT Pub. Date: Mar. 6, 2014

(65) Prior Publication Data
US 2015/0133093 A1    May 14, 2015

(30) Foreign Application Priority Data
Aug. 29, 2012   (CN) .......................... 2012 1 0311682

(51) Int. Cl.
*H04M 3/42*     (2006.01)
*H04M 1/725*    (2006.01)
(Continued)

(52) U.S. Cl.
CPC .......... *H04M 1/72569* (2013.01); *G06T 7/408* (2013.01); *H04M 1/72519* (2013.01);
(Continued)

(58) Field of Classification Search
CPC  H04W 4/16; H04W 8/245; H04L 29/08108; H04M 1/72519; H04M 1/0214; H04M 1/18; H04M 17/026; H04M 1/385; H04B 1/3888
USPC ......... 455/414.1, 550.1, 575.1, 575.3, 575.8, 455/417, 418; 379/437, 451, 433.1
See application file for complete search history.

(56) References Cited

U.S. PATENT DOCUMENTS 5,148,471 A * 9/1992 Metroka ............... H04M 1/271
                                                    379/88.02
7,871,209 B1 * 1/2011 Sampathkumaran .. G03B 17/00
                                                    396/448

(Continued)

FOREIGN PATENT DOCUMENTS

| CN | 102638598 A | 8/2012 |
| CN | 102647509 A | 8/2012 |
| CN | 102833416 A | 12/2012 |

*Primary Examiner* — Steve D Agosta
(74) *Attorney, Agent, or Firm* — Shimokaji IP

(57) ABSTRACT

A method for controlling a mobile phone to be mute through flip, and a mobile phone are provided. The method comprises, when a mobile phone receives a call, detecting a situational pattern of the mobile phone. If the situational pattern is a ringing pattern, the method includes controlling a front-facing camera to acquire image data every preset time and if the current image data is representative of an all-black image and image data acquired in the previous time is not representative of an all-black image, switching the situational pattern of the mobile phone into a mute pattern and controlling the front-facing camera to stop acquiring image data. By means of the present invention, a user can conveniently and quickly switch a situational pattern of a mobile phone into a mute pattern by simply flipping over the user's mobile phone.

10 Claims, 5 Drawing Sheets

(51) Int. Cl.
*G06T 7/40* (2006.01)
*H04M 19/04* (2006.01)
*H04N 5/225* (2006.01)
*H04N 5/232* (2006.01)
*H04M 1/02* (2006.01)

(52) U.S. Cl.
CPC ........... *H04M19/042* (2013.01); *H04N 5/225* (2013.01); *H04N 5/23245* (2013.01); *G06T 2207/10004* (2013.01); *H04M 1/0245* (2013.01); *H04M 2250/52* (2013.01)

(56) References Cited

U.S. PATENT DOCUMENTS

| | | | |
|---|---|---|---|
| 2003/0153364 A1* | 8/2003 | Osann, Jr. | H04M 1/6505 455/567 |
| 2006/0088311 A1* | 4/2006 | Lu | G03B 17/02 396/448 |
| 2008/0006762 A1 | 1/2008 | Fadell et al. | |
| 2013/0321551 A1* | 12/2013 | Lindberg | H04N 7/142 348/14.01 |

* cited by examiner

METHOD FOR CONTROLLING MOBILE PHONE TO BE MUTE THROUGH FLIP AND MOBILE PHONE

TECHNICAL FIELD

The present disclosure relates to the field of mobile terminals and, in particular, to a method for controlling a mobile phone to be mute through flip and to a mobile phone.

BACKGROUND

With the development of mobile communication technologies, wireless communication devices are increasingly intelligentized. A smart phone having a function of being mute through flip is now available. The phrase "being mute through flip" is commonly understood to mean that a user can automatically switch a situational pattern (e.g., a ring pattern, a vibrate pattern or a mute pattern) of a mobile phone into a mute pattern by simply turning a front face of the mobile phone downwards when the mobile phone receives a call. With this function, the user does not have to reject an incoming call in some specific occasions, such as during a meeting or a class, where it is not appropriate to have an incoming ring tone or vibra alert on, and the user can quickly and conveniently switch a situational pattern of the mobile phone into a mute pattern with a simple flip action of the mobile phone.

However, existing methods for controlling a mobile phone to be mute through flip are generally implemented by using a gravity sensor, a direction sensor and the like to detect a flip action. The essence of known methods is to calculate whether a user makes a flip action of a mobile phone by acquiring a 3D acceleration value of the mobile phone. However, known methods can easily cause erroneous judgment. For example, when a mobile phone is in a moving state together with a user, who, for instance, is riding on a vehicle, such as a train, a car and the like, a 3D acceleration value of the mobile phone is affected by an external environment and an erroneous judgment is easily caused. Similarly, an erroneous judgment may be result when a mobile phone is placed on a supporting surface with a certain degree of inclination, for example, when a user is having an art class or an English video class, and a desk associated with the user has an inclination of more than 30 degrees. When a mobile phone is not placed horizontally, the mobile phone cannot recognize a flip action when a user flips the phone. Under such circumstances, although the user makes a flip action of the mobile phone, the effect of controlling the mobile phone to be mute cannot be achieved, which brings inconvenience to the user.

Therefore, the prior art still needs to be improved and developed.

SUMMARY

A method for controlling a mobile phone to be mute through flip and a mobile phone include detecting a situational pattern of the mobile phone when a mobile phone receives a call; if the situational pattern is a ringing pattern, controlling a front-facing camera, placed on a plane where the main operation interface of the mobile phone is located, to acquire image data based on a preset time; transmitting the image data to a mobile phone base band chip; and using the mobile phone base band chip to determine whether the image data is all-black image data and caching storing a determination result; if the current image data is determined to be all-black and image data acquired in the previous time is determined to not be all-black image data, switching the situational pattern of the mobile phone into a mute pattern, and controlling the front-facing camera to stop acquiring image data.

In another embodiment, a method for controlling a mobile phone to be mute through flip includes detecting a situational pattern of the mobile phone when a mobile phone receives a call; if the situational pattern is detected to be a ringing pattern, controlling a front-facing camera, placed on a plane where the main operation interface of the mobile phone is located, to acquire image data based on a preset time; and determining whether the image data is all-black image data and caching storing a determination result; if the current image data is determined to be all-black and image data acquired in the previous time is determined to not be all-black image data, switching the situational pattern of the mobile phone into a mute pattern, and controlling the front-facing camera to stop acquiring image data.

In a further embodiment, a mobile phone to be mute through flip includes a base band chip, a front-facing camera and a ring output module, wherein the base band chip further comprises an image acquisition module, an all-black judgment module, a flip judgment module and a ring control module, wherein: the front-facing camera is placed on a plane where the main operation interface of the mobile phone is located, and is used for acquiring image data based on a preset time when the mobile phone receives a call and a situational pattern of the mobile phone is a ringing pattern, and transmitting the image data to the image acquisition module; the image acquisition module is used for acquiring image data transmitted by the front-facing camera when the mobile phone receives a call and the situational pattern of the mobile phone is a ringing pattern; the all-black judgment module is used for determining whether the image data acquired by the image acquisition module is all-black image data, and caching storing a determination result; the flip judgment module is used for sending a mute control message to the ring control module when the all-black judgment module determines that the current image data is all-black image data and the image data acquired in the previous time is not all-black image data, and triggering the base band chip to control the front-facing camera to stop acquiring image data at the same time; and the ring control module is used for controlling the ring output module to output different modes of rings.

According to the method for controlling a mobile phone to be mute through flip and the mobile phone provided by the present invention, a mobile phone is added with a new function. That is, when a mobile phone receives a call, the mobile phone automatically detects a situational pattern. When the situational pattern is not a mute pattern, image data is acquired in real time through a front-facing camera of the mobile phone, and the acquired image data is transmitted to a mobile phone base band chip. When the acquired image data is determined to be all-black image data and the image data acquired in previous time is determined not to be all-black image data, the mobile phone is considered to have flipped, and the mobile phone automatically switches the situational pattern into the mute pattern. Through the technical solution of the present invention, a user can conveniently and quickly switch a situational pattern of a mobile phone into a mute pattern through a simple flip action of the mobile phone and can make the phone mute without needing to reject the incoming call in some specific occasions which are not suitable for playing the incoming ring or vibra alert, such as during a meeting, a class and the like. The mobile phone of the present disclosure is particularly suitable for a situation when the mobile phone is under a moving state or located on an inclined plane. Moreover, the mobile phone of the present disclosure has a simple structure and high control accuracy, and provides conveniences for the user.

DETAILED DESCRIPTION

A method for controlling a mobile phone to be mute through flip and a mobile phone are described in detail with reference to the drawings hereinafter. It should be understood that the specific embodiments are for explaining the present invention only and are not intended to limit the scope of the present invention as defined by the appending claims.

A mobile phone to be mute through flip, which may be used for performing the method for controlling a mobile phone to be mute through flip, may include a memory and one or more than one program, wherein the one or more than one program may be stored in the memory, and may be configured to perform the method for controlling a mobile phone to be mute through flip according to the embodiments of the present invention when executed by one or more than one processor. The method for controlling a mobile phone to be mute through flip according to the embodiments of the present invention may also be used for other electronic mobile terminals, which include, but are not limited to, smartphones, tablet computers, e-book readers and MP4s (Moving Picture Experts Group Audio Layer IV) player and the like.

Figure 1:
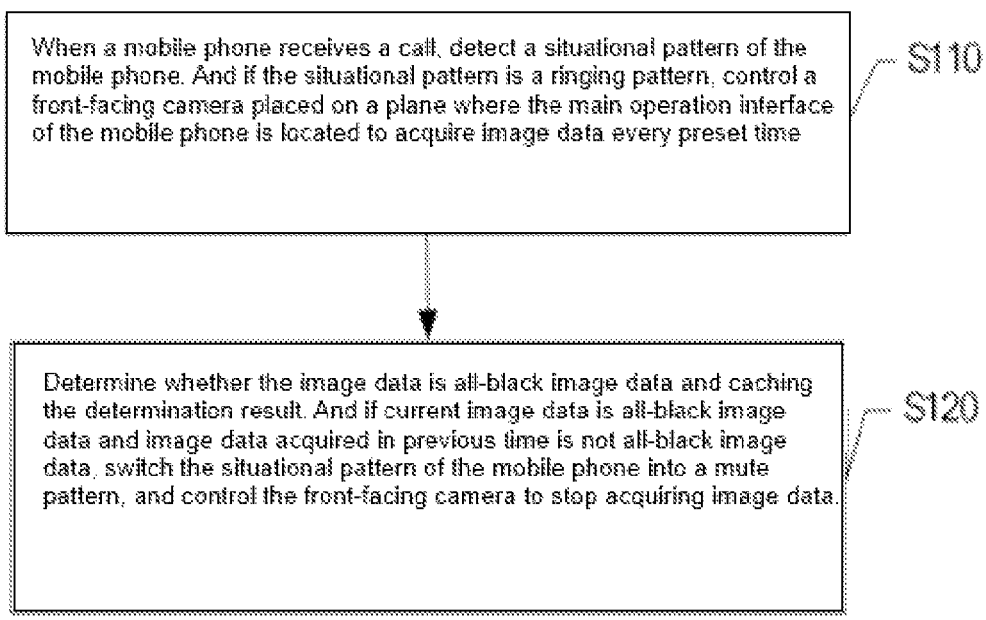
FIG. 1 depicts a flow chart of an example embodiment of a method for controlling a mobile phone to be mute through flip according to the present invention.

Turning to FIG. 1, a flow chart of a method for controlling a mobile phone to be mute through flip automatically detecting a situational pattern of the mobile phone when the mobile phone receives a call (block S110). When a situational pattern of the mobile phone is not a mute pattern (such as being a ringing pattern), image data may be acquired through a front-facing camera, placed on a plane where the main operation interface of the mobile phone is located, and the acquired image data may be transmitted to a mobile phone base band chip. The plane where the main operation interface of the mobile phone is located may be a flat plane, and the front-facing camera may be placed on the plane. The front-facing camera of the mobile phone may acquire image data based on a preset time. The preset time may be 100 ms, 50 ms and the like. The preset time value may be set and saved in a mobile phone system when the mobile phone is delivered. For example, the front-facing camera of the mobile phone may acquire image data every 50 ms, and the image data acquired may be either a frame of image data or multiple frames of image data.

The method may further include determining whether the image data is all-black image data and caching a determination result (block S120). When determining that the currently acquired image data is all-black image data, the method may check whether the cached image data acquired in the previous time is all-black image data. When the currently acquired image data is determined to be all-black image data and the image data acquired in the previous time is determined not to be all-black image data, the mobile phone may be considered to have been flipped and a situational pattern of the mobile phone may be controlled to switch to the mute pattern, and the front-facing camera may be controlled to stop continuously acquiring image data.

Under normal situations, the mobile phone may be placed with a front side upwards. After the mobile phone is flipped, the front side of the mobile phone may be facing downwards and may be in contact with such a supporting surface as a desktop and the like. At this time, image data captured by a front-facing camera, installed on a plane (namely, a front side of the mobile phone) of the main operation interface of the mobile phone, may include all-black image data. When a mobile phone is placed in a pocket or bag, although image data acquired by the mobile phone may be all-black image data, a ringing pattern of the mobile phone may not be automatically switched to a mute pattern at this moment because image data acquired in a previous time may also be all-black image data, and the mobile phone may have an action of changing from a non-all-black environment to an all-black environment. Adopting the method according to the present invention to recognize whether the mobile phone has a flip action so as to control the mobile phone to switch a situational pattern, which is not limited by a supporting surface for placing the mobile phone and the acceleration of the located environment. Therefore, control accuracy related to a flipping action may be very high. Meanwhile, by comparing image data acquired twice, a situation may be avoided where a user misses an incoming call due to mute of the incoming call when a user puts a mobile phone in the user's pocket or bag.

In addition, in embodiments of the present invention, when the mobile phone receives a call, a mobile phone base band chip may monitor whether a hang-up signal exists in real time. When monitoring that another side hangs up a call, a mobile phone may be controlled to terminate ringing. Meanwhile, a front-facing camera may be controlled to stop acquiring image data. This may be carried out independently, and may not be influenced by mute control through flip.

Detecting a situation pattern of a mobile phone (block S110) may include the mobile phone automatically detect a situational pattern thereof when a mobile phone receives a call. If the situational pattern is a ringing pattern, the front-facing camera of the mobile phone may be controlled to acquire image data based on a preset time, wherein a frame of image data may be acquired every time. The front-facing camera may be by a frame synchronization signal to transmit acquired image data of a current frame to a base band chip. Moreover, a front-facing camera may be triggered to transmit a frame of image data in each time when receiving a frame synchronization signal.

One frame of images may consist of a plurality of pixels, for example, one frame of images may consist of CMAX pixels. Therefore, determining whether image data is all-black image data (block S120) may include determining whether all the pixels of the image data are black one by one. Determining whether all the pixels of an image are block may include determining whether all the pixels of the image are black according to a format of image data transmitted between a base band chip and a front-facing camera For example, when a transmitting format of the image data is YUV, data of the pixel may include three variables, Y, U and V, which may represent pixel colors. When the three variables of the data of one pixel are Y=0, U=128 and V=128, it may indicate that the given pixel is black. Determining whether all the pixels of the image data satisfy Y=0, U=128 and V=128 one by one may be used to determine whether all the pixels of the image data are black. When all the pixels included in the image data are determined to be black, the image data may be considered to be all-black image data. In another example, when a transmitting format of the image data is RGB, data of the pixel may include three variables R, G and B which may represent color variables of the pixels. When the three variables of the data of one pixel are R=0, G=0 and B=0, it may indicate that the given pixel is black. Determining whether all the pixels of the image data satisfy R=0, G=0 and B=0, one by one may be used to determine whether all the pixels of the image data are black. When all the pixels included in the image data are determined to be black, the image data may be considered to be all-black image data.

In the foregoing examples, when a certain pixel in the image is determined not to be black, then the image data may be determined to be not all-black image data without needing to determine whether other pixels of the image are black, which may be beneficial for saving memory, and improving the running speed of a system.

Figure 2:
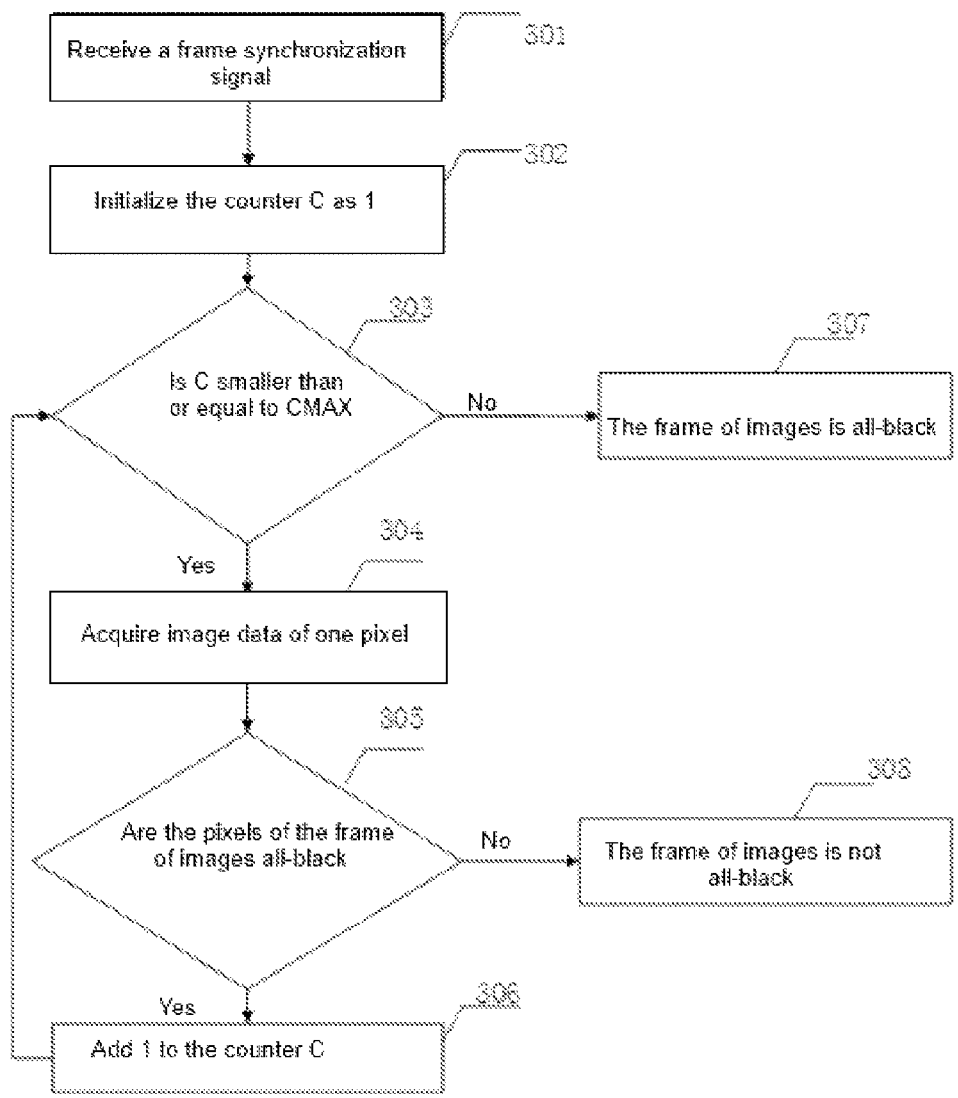
FIG. 2 depicts a flow chart of determining whether a frame of image data is all-black image data in an example embodiment of a method for controlling a mobile phone to be mute through flip according to the present invention.

With reference to FIG. 2, a flow chart of determining whether one frame of image data is all-black image data for use in a method for controlling a mobile phone to be mute through flip is depicted. As shown in FIG. 2, if one frame of images consists of CMAX pixels, then determining the all-black data may include the front-facing camera receiving one frame synchronization signal and transmitting one frame of image data to a mobile phone base band chip (block 301). To be specific, a front-facing camera may receive one frame synchronization signal and may transmit CMAX pixel data of one frame of images to the mobile phone base band chip.

The base band chip may initialize a counter C, wherein an initial value may be 1 (block 302). A current value of the counter C may be compared with a number of CMAX pixels included in the image, and it may be detected whether the current value of the counter C is smaller than or equal to the number of CMAX pixels in the image (block 303). If the counter C is smaller than or equal to the number CMAX pixels in the image, then one pixel from the image data of the current frame is acquired (block 304), whether the currently acquired pixel data is black may be determined by using a specific determining method as described above (block 305). If the current pixel is black, then add 1 for the counter C, return to (block 303) and continuously determine whether other pixel data is black. When a certain pixel in the image is found not to be black (block 305), the image data may be determined to not be all-black image data without needing to determine whether other pixels of the image are black (block 308). The process of determining whether the image data is all-black image data is finished.

If the counter C is not smaller than or equal to the number of CMAX pixels in the image and when all the pixels included in the image data are black, the image data is determined to be all-black image data (block 307). The process of determining whether the image data is all-black image data is finished.

Figure 3:
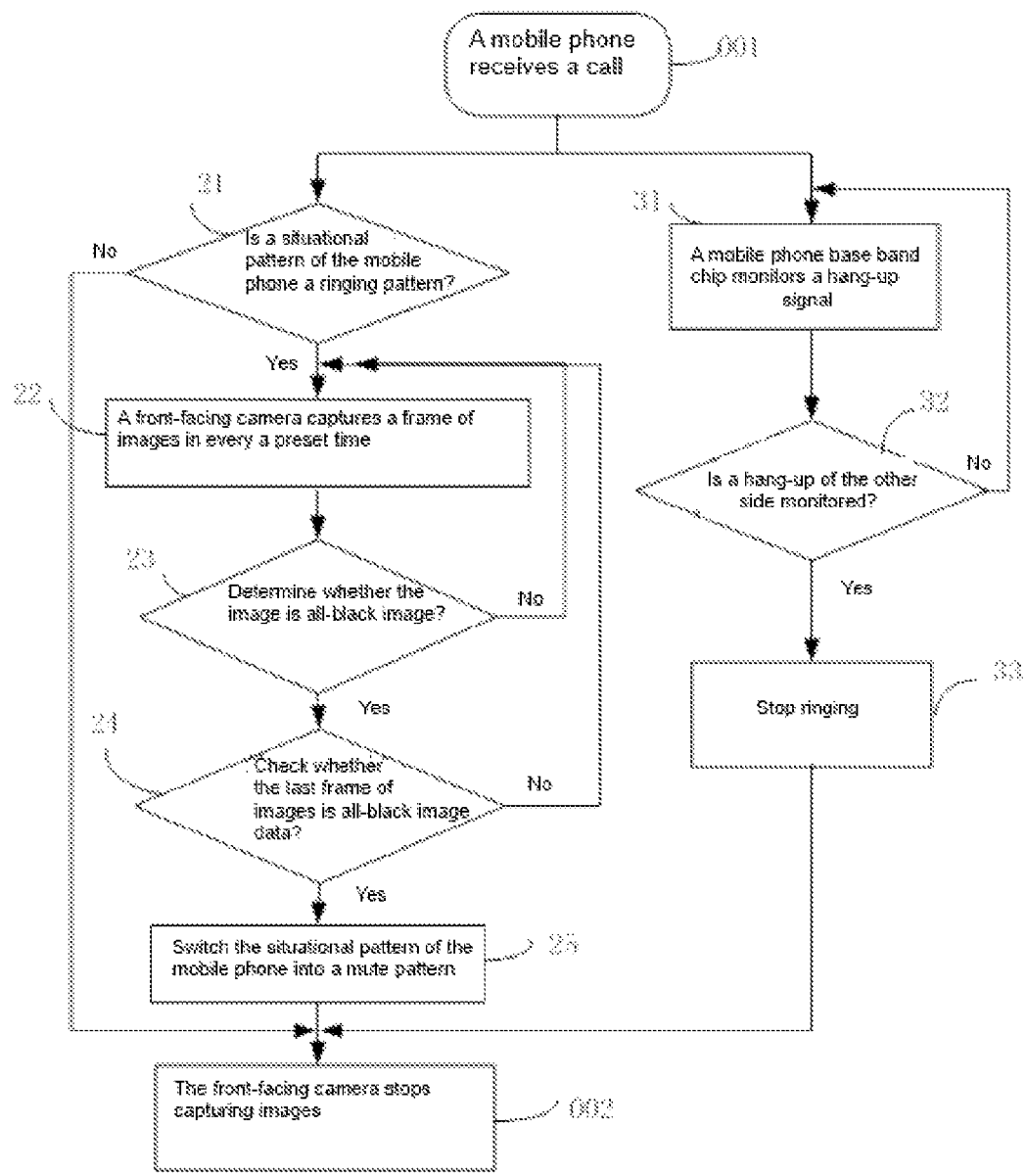
FIG. 3 depicts a flow chart of an example of applying and implementing a method for controlling a mobile phone to be mute through flip according to the present invention.

Turning to FIG. 3, a flow chart of a method for controlling a mobile phone to be mute through flip may include a mobile phone receiving a call (block 001). The mobile phone may monitor whether a situational pattern thereof is not a mute pattern (block 21). If the situational pattern is a mute pattern, directly skip to block 002. Otherwise, a front-facing camera may capture a frame of images based on a preset time, and may transmit the frame of images captured to a mobile phone base band chip (block 22).

The mobile phone base band chip may determine whether the image data is all-black image data (block 23). If the image data is determined to be all-black image data (block 23, check whether a last frame of images is all-black image data (block 24). If the image data is determined not to be all-black image data (block 23) return to block 22. If a last frame of images is determined to be all-black image data (block 24), then control the mobile phone to switch the situational pattern of the mobile phone into a mute pattern (block 25), and control the front-facing camera of the mobile phone to stop continuously capturing images, and the mobile phone finishes mute control through flip (block 002). If a last frame of images is determined to not be all-black image data (block 24), the return to block 22.

Meanwhile, the mobile phone base band chip may further monitor whether a hang-up signal exists in real time. Therefore, after the process of mute control through flip of the mobile phone when receiving a call, (block 001), the mobile phone receives a call (block 001) and the mobile phone base band chip monitors a hang-up signal in real time (block 31) at the same time.

A determination may be made as to whether a hang-up of the other side has occurred (block 32). If a hang-up of the other side is determined to have occurred (block 32), the mobile phone stops ringing (block 33) and then immediately the front-facing camera may stop capturing images (block 002). If a hang-up of the other side is not determined to have occurred (block 32), then return to block 31.

Because blocks 31-33 may be performed asynchronously from blocks 21-25, no matter which one of blocks 21, 22, 23, 24 and 25 is performed, the performing of blocks 31-33 may not be influenced. Moreover, as long as the determination result of block 32 is true block 33 may be immediately performed and block 002 may be entered. Thereby, the function of being mute through flip is also closed, which namely terminates performing blocks 21-25 immediately.

Figure 4:
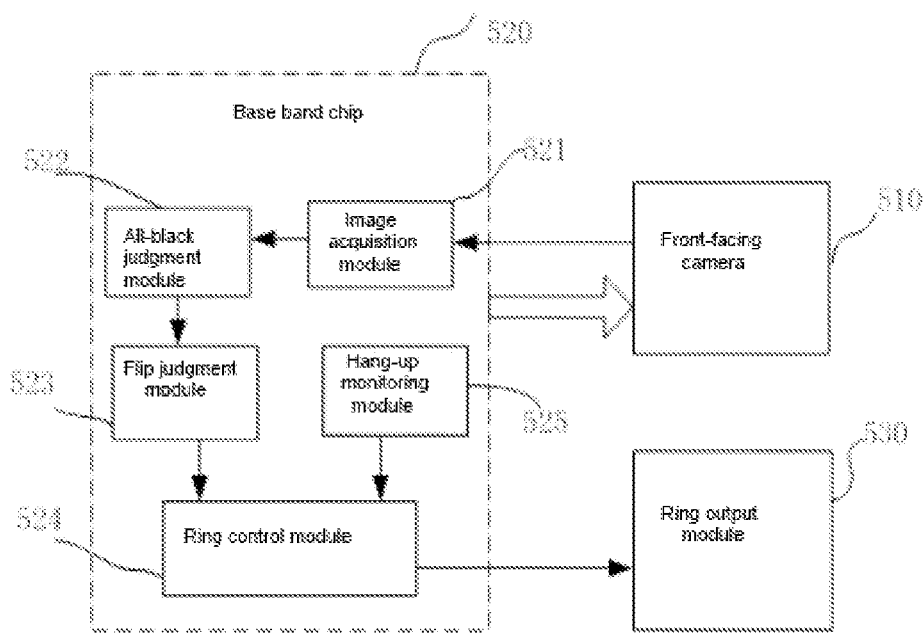
FIG. 4 depicts a structure block diagram of an example embodiment of a mobile phone to be mute through flip according to the present invention.

With reference to FIG. 4, a mobile phone that may be mute through flip may include a front-facing camera 510, a base band chip 520 and a ring output module 530. A base band chip 520 may further include an image acquisition module 521, an all-black judgment module 522, a flip judgment module 523, a ring control module 524 and a hang-up detection module 525.

The front-facing camera 510 may be set on the main operation interface of the mobile phone, which may be used for acquiring image data based on a preset time when the mobile phone receives a call and a situational pattern of the mobile phone is in a ringing pattern, and for transmitting the image data to a base band chip 520. The preset time may be 100 ms, 50 ms and the like. The preset time value may be set and saved in a mobile phone system when delivery. Details may be as described in the foregoing embodiments and will not be repeatedly described any longer.

The image acquisition module 521 may be used to acquire image data transmitted by the front-facing camera 510 when the mobile phone receives a call and the situational pattern of the mobile phone is a ringing pattern. Details may be as described in the foregoing embodiments.

The all-black judgment module 522 may be used for determining whether image data received by the image acquisition module 521 is all-black image data and caching storing a determination result. Details may be as described in the foregoing embodiments.

The flip judgment module 523 may be used for checking, when the all-black judgment module 522 determines that the currently acquired image data is all-black image data, whether the determination result of the all-black judgment module 522 for the image data acquired in the previous time is not all-black image data; when the image data acquired in the previous time is not all-black image data, then determining a flip action occurs to the mobile phone, and sending a mute control message to the ring control module 524. Details may be as described in the foregoing embodiments.

The hang-up monitoring module 525 may be used for monitoring a hang-up signal, and may be used for sending a ring termination message to the ring control module 524 when monitoring that the other side hangs up the call. Details may be as described in the foregoing embodiments.

The ring control module 524 may be connected with the ring output module 530, may be used for controlling the ring output module 530 to output mute after receiving the mute control message, and may be used for controlling the ring output module 530 to terminate to output ring after receiving the ring termination message.

Further, the base band chip 520 may be used for controlling the front-facing camera 510 to stop continuously capturing the image (acquiring the image data) when the flip judgment module 523 determines that a flip action occurs to the mobile phone, or when the hang-up monitoring module 525 monitors that the other side hangs up the call. Details may be as described in the foregoing embodiments.

Figure 5:
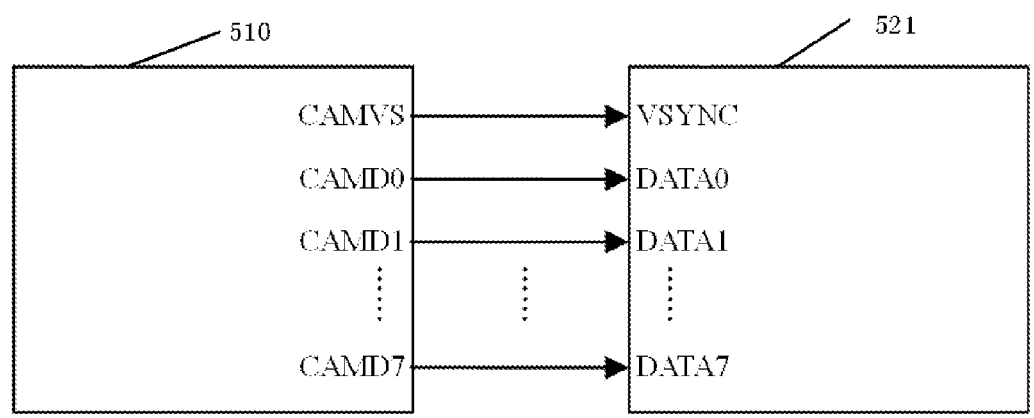
FIG. 5 depicts a schematic diagram for an example for connecting a front-facing camera and an image acquisition module of an embodiment of a mobile phone to be mute through flip according to the present invention.

Turning to FIG. 5, a front-facing camera 510 is depicted an may be connected with an image acquisition module 521 of the mobile phone base band chip. A frame synchronization signal line CAMVS of the front-facing camera 510 may be connected with a frame synchronization signal line VSYNC of the image acquisition module 521. The data signal lines CAMD0-CAMD7 of the front-facing camera 510 may be respectively connected with the data signal lines DATA0-DATA7 of the image acquisition module 521. Through this connecting relationship, when the front-facing camera receives a frame synchronization signal, the process of transmitting one frame of image data may be, when a frame synchronization signal line CAMVS of a front-facing camera changes from a low level to a high level, an image acquisition module 521 may be triggered to start receiving a frame of image data; CMAX pixels of the frame of image data may be outputted one by one through the data signal lines CAMD0-CAMD7 of the front-facing camera, and may be received by the data signal lines DATA0-DATA7 of the image acquisition module 521. When a frame synchronization signal line CAMVS changes from a high level to a lower level, the image acquisition module 521 may be notified that the current frame of image data is completely transmitted, and the data signal lines DATA0-DATA7 of the image acquisition module 521 may stop receiving data.

Figure 6:
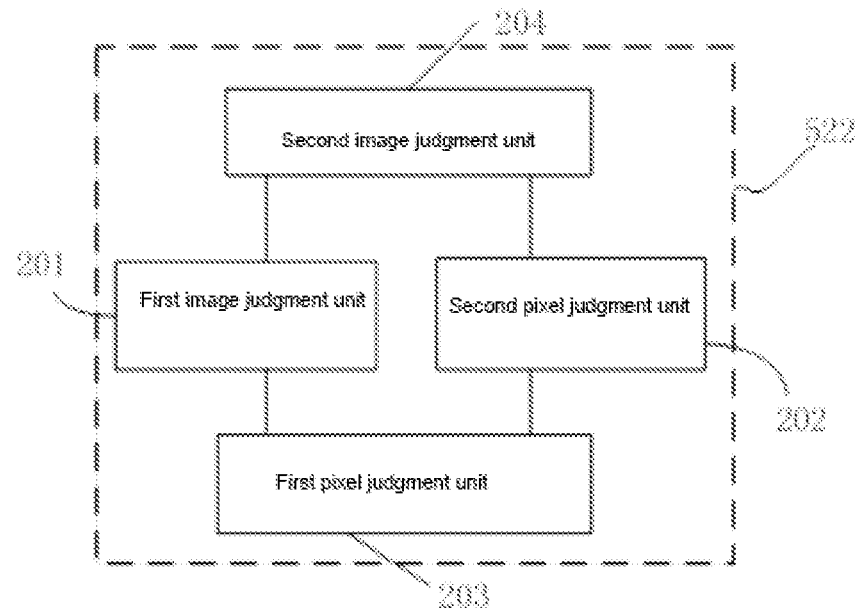
FIG. 6 depicts a specific structure block diagram of an example all-black judgment module of an embodiment of a mobile phone to be mute through flip according to the present invention.

Turning to FIG. 6, an all-black judgment module 522 may include a first pixel judgment unit 201 that may be used for determining whether all pixels of the image data satisfy Y=0, U=128 and V=128 when a transmitting format of the image data is YUV; if all pixels of the image data satisfy Y=0, U=128 and V=128, then determining that the pixel is black; a second pixel judgment unit 202 that may be used for determining whether all the pixels of the image data satisfy R=0, G=0 and B=0 when the transmitting format of the image data is RGB; if all the pixels of the image data satisfy R=0, G=0 and B=0, then determining that the pixel is black; a first image judgment unit 203 that may be used for determining that the image data is the all-black image data when all the pixels included in the image data are black; and a second image judgment unit 204 that may be used for determining that the image data is not the all-black image data when detecting that one of the pixels is not black.

Figure 7:
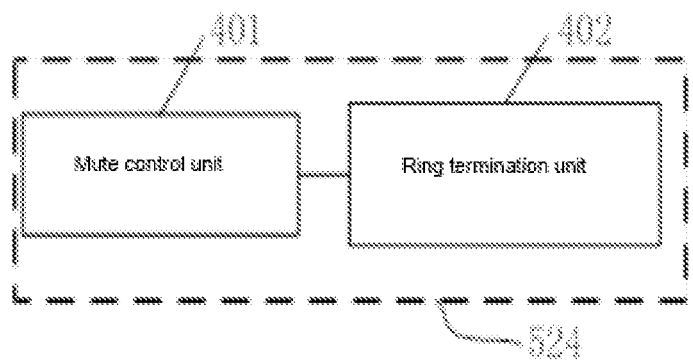
FIG. 7 depicts a specific structure block diagram of an example ring control module of an embodiment of a mobile phone to be mute through flip according to the present invention.

With reference to FIG. 7, a ring control module 524 may include a mute control unit 401 that may be used for controlling the ring output module 530 to output mute when receiving the mute control message; and a ring termination unit 402 that may be used for controlling the ring output module 530 to terminate the ring when the hang-up monitoring module 521 monitors that the other side hangs up the call. A main operation interface of the mobile phone may be a flat plane, and the front camera may be placed on the plane.

According to a method for controlling a mobile phone to be mute through flip and the mobile phone provided by the present invention, a mobile phone may be added with a new function. That is, when the mobile phone receives a call, the mobile phone may automatically detect a situational pattern. When the situational pattern is not a mute pattern, image data may be acquired in real time through a front-facing camera of the mobile phone, and the acquired image data may be transmitted to a mobile phone base band chip. When the acquired image data is determined to be all-black image data and the image data acquired in a previous time is determined not to be all-black image data, a flip action of the mobile phone may be considered to have occur, and the mobile phone may automatically switch the situational pattern into a mute pattern. Through the technical solution of the present invention, a user of a mobile phone can conveniently and quickly switch a situational pattern of the mobile phone into a mute pattern through a simple flip action of the mobile phone and can make the mobile phone mute without needing to reject the incoming call in some specific occasions which are not suitable for playing the incoming ring or vibra alert, such as during a meeting, a class and the like. The mobile phone may be particularly suitable for a situation when the mobile phone is under a moving state or located on an inclined plane. Moreover, the mobile phone may have a simple structure and high control accuracy, and provides convenience for the user.

A person having ordinary skill in the art may understand that all or partial flows for implementing the methods according to the foregoing embodiments are programs that may be finished by relational hardware instructed by a computer program, and may be stored in a readable storage medium. The program may include each method according to the foregoing embodiments. The storage medium may be a disk, an optical disk, a read-only memory (ROM) or a random access memory (RAM), and the like.

It should be understood that applications of the present invention are not limited to the foregoing examples. Furthermore, the invention may be applied to other mobile terminals. All improvements and transformations shall fall within the scope of the appending claims.

The invention claimed is:

1. A method for enabling mute through flip functionality on a mobile phone such that flipping the mobile phone onto a supporting surface switches a situational pattern of the mobile phone into a mute pattern that turns off an incoming ring tone and a vibrate alert of the mobile phone, the method comprising:
   detecting the situational pattern of the mobile phone when a mobile phone receives a call;
   if the situational pattern is in a ringing pattern, controlling a front-facing camera, placed on a plane where the main operation interface of the mobile phone is located, to acquire image data based on a preset time;
   transmitting the image data to a mobile phone base band chip using a frame synchronization signal generated from the front-facing camera to trigger the front-facing camera to transmit the image data to the mobile phone base band chip; and
   using the mobile phone base band chip to determine whether the image data is all-black and caching a determination result;
   if a current image data is determined to be all-black and the determination result indicates that image data acquired in a previous time is not all-black, concluding that the current image data corresponds to the supporting surface and switching the situational pattern of the mobile phone from the ringing pattern into the mute pattern, and controlling the front-facing camera to stop acquiring image data;
   wherein determining whether the image data is all-black comprises determining whether each pixel in the image data is black; and when detecting that one of the pixels is not black, determining that the image data is not all-black; wherein determining whether each pixel in the image data is black comprises:
   if a transmitting format of the image data is YUV, then determining whether all of the pixels of the image data satisfy Y=0, U=128 and V=128 one by one; if yes, then determining that the respective pixel is black;
   if the transmitting format of the image data is RGB, then determining whether all of the pixels of the image data satisfy R=0, G=0 and B=0 one by one; if yes, then determining that the respective pixel is black; and
   when all the pixels included in the image data are determined to be black, then determining that the image data is all-black.

2. The method according to claim 1, further comprising:
   controlling the mobile phone to stop ringing and controlling the front-facing camera to stop acquiring the image data when monitoring phone hang-up.

3. The method according to claim 1, wherein one frame synchronization signal triggers the front-facing camera to transmit one frame of the image data.

4. A method for enabling mute through flip functionality on a mobile phone such that flipping the mobile phone onto a supporting surface switches a situational pattern of the mobile phone into a mute pattern that turns off an incoming ring tone and a vibrate alert of the mobile phone, the method comprising:
   receiving a call on a mobile phone;
   detecting a situational pattern of the mobile phone after the mobile phone receives the call; if the situational pattern is detected to be a ringing pattern, controlling a front-facing camera, placed on a plane where the main operation interface of the mobile phone is located, to acquire image data based on a preset time;
   using a frame synchronization signal generated from the front facing camera to trigger the front facing camera to transmit the image data to a mobile phone base band chip; and
   determining whether the image data is all-black and caching the determination result;
   if a current image data is determined to be all-black and the determination result indicates that image data acquired in a previous time is not all-black, concluding that the current image data corresponds to the supporting surface and switching the situational pattern of the mobile phone from the ringing pattern into the mute pattern, and controlling the front-facing camera to stop acquiring image data;
   wherein determining whether the image data is all-black comprises determining whether each pixel in the image data is black; and when detecting that one of the pixels is not black, determining that the image data is not all-black; wherein determining whether each pixel in the image data is black comprises:
   if a transmitting format of the image data is YUV, then determining whether all of the pixels of the image data satisfy Y=0, U=128 and V=128 one by one; if yes, then determining that the respective pixel is black;
   if the transmitting format of the image data is RGB, then determining whether all of the pixels of the image data satisfy R=0, G=0 and B=0 one by one; if yes, then determining that the respective pixel is black; and
   when all the pixels included in the image data are determined to be black, then determining that the image data is all-black.

5. The method according to claim 4, further comprising:
   controlling the mobile phone to stop ringing and controlling the front-facing camera to stop acquiring the image data when monitoring phone hang-up.

6. The method according to claim 4, wherein one frame synchronization signal triggers the front-facing camera to transmit one frame of the image data.

7. A mobile phone with mute through flip functionality such that flipping the mobile phone onto a supporting surface switches a situational pattern of the mobile phone into a mute pattern that turns off an incoming ring tone and a vibrate alert of the mobile phone, the mobile phone comprising:
   a base band chip which comprises an image acquisition module, an all-black judgment module, a flip judgment module and a ring control module;
   a front-facing camera, placed on the main operation interface of the mobile phone, used for acquiring image data based on a preset time when the mobile phone receives a call and the situational pattern of the mobile phone is a ringing pattern, and transmitting the image data to the image acquisition module, wherein a frame synchronization signal generated from the front-facing camera is used to trigger the front-facing camera to transmit the image data to the image acquisition module; and
   a ring output module,
   wherein the image acquisition module is used for acquiring image data transmitted by the front-facing camera when the mobile phone receives a call and the situational pattern of the mobile phone is a ringing pattern;
   the all-black judgment module is used for determining whether the image data acquired by the image acquisition module is all-black and caching storing a determination result;

wherein the all-black judgment module is used for determining whether each pixel in the image data is black; and when detecting that one of the pixels is not black, determining that the image data is not all-black;

wherein the all-black judgment module comprises:
- a first pixel judgment unit, used for determining whether all pixels of the image data satisfy Y=0, U=128 and V=128 when a transmitting format of the image data is YUV; if yes, then determining that the respective pixel is black;
- a second pixel judgment unit, used for determining whether all the pixels of the image data satisfy R=0, G=0 and B=0 when the transmitting format of the image data is RGB; if yes, then determining that the respective pixel is black; and
- a first image judgment unit, used for determining that the image data is all-black when all the pixels included in the image data are determined to be black; and
- a second image judgment unit, used for determining that the image data is not all-black when one of the pixels is determined not to be black;

the flip judgment module is used for sending a mute control message to the ring control module when the all-black judgment module determines that the current image data corresponds to the supporting surface, as indicated by the current image data being all-black and the determination result indicating that the image data acquired in a previous time is not all-black, and triggering the base band chip to control the front-facing camera to stop acquiring image data at the same time; and the ring control module is used to turn off the incoming ring tone and the vibrate alert of the mobile phone in response to receiving the mute control message.

8. The mobile phone according to claim 7, wherein the base band chip further comprises:
- a hang-up monitoring module, used for sending a ring termination message to the ring control module when monitoring a phone hang-up, and also used for triggering the base band chip to control the front-facing camera to stop acquiring image data at the same time.

9. The mobile phone according to claim 8, wherein the ring control module comprises:
- a ring termination unit, used for controlling the ring output module to terminate the ring when receiving the ring termination message.

10. The mobile phone to be mute through flip according to claim 7, wherein one frame synchronization signal triggers the front-facing camera to transmit one frame of the image data.

* * * * *